Patented May 13, 1952

2,596,156

UNITED STATES PATENT OFFICE 2,596,156

AMINOALKYL ESTERS OF N,N-DIARYLAN-THRANILIC ACIDS AND SALTS THEREOF

Carl Peter Krimmel, Evanston, Ill., assignor to G. D. Searle & Co., Chicago, Ill., a corporation of Illinois No Drawing. Application April 20, 1949, Serial No. 88,699

15 Claims. (Cl. 260—247.2)

This application relates to aminoalkyl esters of N,N-diarylaminobenzoic acids, to the salts thereof, and to methods of preparing such compounds. More particularly this invention relates to basic esters of the following general formula

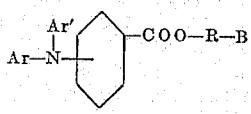

wherein Ar and Ar' are aryl radicals, R is an alkylene radical, and B is an aliphatic-type amino radical.

In the foregoing structural formula Ar and Ar' may be the same or different aryl radicals and are preferably aryl radicals of the benzene series. Among such radicals are phenyl, anisyl, phenetyl, tolyl, xylyl, ethylphenyl, naphthyl, xenyl, and related radicals. R represents a bivalent aliphatic hydrocarbon radical containing 2 to 5 carbon atoms. Preferably R represents a lower alkylene radical, which may be straight or branch-chained, including ethylene, propylene, 1,2-, 2,3- and 1,3-butylene, and the amylene radicals, and polymethylene radicals containing from 2 to 5 carbon atoms. The amino radical B represents aliphatic amino groups and cyclic amino groups which are aliphatic in character. Among such amino groups are the mono-(lower alkyl) amino groups and di-(lower alkyl) amino groups wherein the alkyl radicals contain 1 to 5 carbon atoms. Other aliphatic amino groups such as hydroxyalkyl- and dihydroxyalkylamino groups are within the scope of this invention. Cyclic amino groups such as piperidino, pyrrolidino, morpholino, thiamorpholino, piperazino, lupetidino, and related amino radicals derived from aliphatic-type heterocyclic amines having disassociation constants in the range of $10^{-3}$ to $10^{-5}$ are also within the purview of this invention.

The compounds of this invention are preferably prepared by reacting an acid of the general structural formula

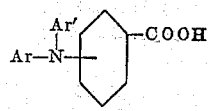

with an amino alkyl halide of the formula

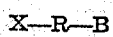

wherein X represents halogen, preferably middle halogen (chlorine or bromine). These reactions are generally carried out in inert organic solvents having boiling points in the range of 50–150° C.

Among such solvents are ethanol, propanol, isopropanol, butanol, acetone, methyl ethyl ketone, benzene, toluene, xylene, cyclohexane, and hydrocarbon fractions boiling in the range of 80–150° C., as well as high boiling ethers such as dibutyl ether. The reactions are generally carried out by mixing equivalent quantities of the acid and amino halide and refluxing the mixture in an inert solvent for several hours. Reasonable excesses of either reagent are not deleterious. Often slight excesses (2–5%) of the basic halide are used. In certain instances the hydrohalide of the basic ester is insoluble in the reaction medium and crystallizes out upon cooling. These crystalline salts may be removed by filtration and purified by washing and/or recrystallization. In cases where the salt of the basic ester is soluble in the organic medium, the esters may be isolated by evaporation of the solvent followed by extraction of the organic base from an aqueous alkaline solution. The bases in general can be distilled under reduced pressure. They are usually light colored viscous oils, which are readily soluble in aqueous acids and in organic solvents. The basic esters form crystalline salts with strong acids including hydrochloric, hydrobromic, sulfuric, phosphoric, sulfamic, tartaric, citric, malic, maleic, lactic, oxalic, cinnamic, acetic, benzoic, and similar acids. Quaternary ammonium salts can be prepared by reacting the basic ester with an aliphatic or aromatic-aliphatic ester of a strong acid, generally in an inert solvent. These salts are often crystalline powders which are readily soluble in water. Among the esters of strong acids which can be used are methyl chloride, methyl iodide, ethyl bromide, benzyl chloride, phenethyl bromide, ethylene bromohydrin, dimethyl sulfate, methyl p-toluenesulfonate, ethyl benzenesulfonate, diethyl sulfate, propylene bromohydrin, monochlorohydrin and related esters of strong acids.

The acids which are used as starting materials in my processes can be prepared by reacting an aminobenzoic acid with an aryl halide, preferably an aryl iodide, in the presence of copper powder and alkali in an inert high-boiling solvent at temperatures in the range of 200–250° C. The acids may be obtained in pure form by removal of volatile materials by steam distillation followed by acidification of the aqueous residue.

The substances of my invention are useful as chemical intermediates in the synthesis of dyestuffs and drugs. They are also of value as pharmaceutical agents. Certain of them have diuretic and coronary activity, while others have spasmolytic and antihistaminic action. For the latter purposes, a preferred form of the compounds of this invention is as water-soluble salts, particularly as salts of mineral acids.

My invention is disclosed in further detail by the following examples which are provided solely for the purpose of illustrating the invention and which are intended in no way to be construed as limiting it in spirit or in scope. Relative amounts of materials are given in parts by weight.

*Example 1*

333 parts of N-phenyl-N-p-phenetylanthranilic acid are dissolved in 4000 parts of dry, boiling isopropanol. Then 136 parts of β-diethylaminoethyl chloride are added and the solution is refluxed for 5 hours. The solvent is stripped off under vacuum. The residue is dissolved in water and the solution is washed with ether. The solution is made alkaline and extracted with ether. The ether extract is dried and evaporated, and the residue of β-diethylaminoethyl N-phenyl-N-p-phenetylanthranilate is distilled under reduced pressure; boiling point 230–240° C. at 0.8 mm. pressure.

12 parts of the foregoing ester are dissolved in 650 parts of dry ether and treated with an equivalent of anhydrous hydrogen chloride in dry isopropanol. The precipitate of β-diethylaminoethyl N-phenyl-N-p-phenetylanthranilate hydrochloride is recrystallized from methyl ethyl ketone. It melts at 173–175° C. with sintering from 160° C.

*Example 2*

390 parts of N,N-diphenylanthranilic acid are reacted with 190 parts of β-diethylaminoethyl chloride by the method of Example 1. β-Diethylaminoethyl N,N-diphenylanthranilate is isolated as above and distills at 210–215° C. at 0.4 mm. pressure. It forms a crystalline hydrochloride melting at 188–190° C. after recrystallization from acetone.

*Example 3*

By the method of Example 1, 333 parts of N-phenyl-N-p-phenetylanthranilic acid are reacted in 4000 parts of dry, boiling isopropanol with 108 parts of β-dimethylaminoethyl chloride over a period of 6 hours. The solvent is removed and the residue of β-dimethylaminoethyl N-phenyl-N-p-phenetylanthranilate hydrochloride is taken up in water. The aqueous solution is washed with ether to remove organic material and then made alkaline. The basic ester is removed by extraction with ether. After drying and removal of ether, β-dimethylaminoethyl N-phenyl-N-p-phenetylanthranilate is purified by distillation in vacuo.

*Example 4*

185 parts of N,N-diphenylanthranilic acid are suspended in 2500 parts of dry isopropanol. Then 105 parts of γ-diethylaminopropyl chloride are added. The mixture is refluxed and agitated for 5 hours, during which time the acid dissolves. The hot solution is filtered and evaporated under vacuum. The residue of γ-diethylaminopropyl N,N-diphenylanthranilate hydrochloride is dissolved in water and washed with ether to remove water-insoluble organic materials. The aqueous solution is made alkaline with 35% caustic soda solution and extracted with ether. The ether extract is dried and stripped of solvent. The residue of γ-diethylaminopropyl N,N-diphenylanthranilate is purified by distillation under reduced pressure.

*Example 5*

400 parts of N-phenyl-N-p-tolylanthranilic acid and 177 parts of β-diethylaminoethyl chloride are reacted in 4000 parts of anhydrous isopropanol by the method of Example 1. The basic ester is isolated by the method of Example 1 and distills at 230°–240° C. at 1.5 mm. pressure. It forms a crystalline hydrochloride melting at 188–190° C.

*Example 6*

390 parts of N,N-diphenylanthranilic acid are heated with 268 parts of β-di-n-butylaminoethyl chloride in 5000 parts of boiling isopropanol for 5 hours. The solvent is removed by evaporation and the residual salt is treated with dilute aqueous alkali. The resulting mixture is extracted thoroughly with ether and the ether extract is dried, filtered and evaporated. There is thus obtained a light-colored oily residue of β-di-n-butylaminoethyl N,N-diphenylanthranilate.

*Example 7*

290 parts of N,N-diphenylanthranilic acid are reacted with 110 parts of β-dimethylaminoethyl chloride in 320 parts of anhydrous isopropanol according to the method of Example 1. The organic base is isolated as in Example 1. It is dissolved in dry ether and treated with an equivalent of anhydrous hydrogen chloride in isopropyl alcohol. The crystalline hydrochloride is collected on a filter, washed, and dried. After recrystallization from acetone it melts at 202–204° C.

*Example 8*

303 parts of N-phenyl-N-m-tolylanthranilic acid are dissolved in 4000 parts of dry boiling isopropanol. Then 136 parts of β-diethylaminoethyl chloride are added and the solution is refluxed for 5 hours. The basic ester is isolated as in Example 1. β-Diethylaminoethyl N-phenyl-N-m-tolylanthranilate distils at 215–218° C. at 0.5 mm. pressure and forms a crystalline hydrochloride melting at 177–179° C. after recrystallization from methyl ethyl ketone (with sintering from 173° C.)

*Example 9*

By the method of Example 1, using 303 parts of N-phenyl-N-o-tolylanthranilic acid, there is produced β-diethylaminoethyl N-phenyl-N-o-tolylanthranilate. This compound distils at 210–215° C. at 0.5 mm. pressure. It forms a crystalline hydrochloride which melts at 191–193° C. after recrystallization from methyl ethyl ketone.

*Example 10*

By the method of Example 1, 220 parts of N-phenyl-N-2,4-xylylanthranilic acid are reacted for 5 hours with 95 parts of β-diethylaminoethyl chloride in 4000 parts of dry refluxing isopropanol. The product, β-diethylaminoethyl N-phenyl-N-2,4-xylylanthranilate, is isolated as above. It distils at 219–223° C. at 1.0 mm. pressure. It forms a crystalline hydrochloride which melts at 191–193° C.

*Example 11*

303 parts of N-phenyl-N-m-tolylanthranilic acid in 4000 parts of hot anhydrous isopropanel are refluxed for 6 hours with 122 parts of β-dimethylaminopropyl chloride. The β-dimethylaminopropyl N-phenyl-N-m-tolylanthranilate is isolated by the procedure of Example 1. It forms light-colored oil which is soluble in organic solvents.

Example 12

388 parts of N,N-diphenylanthranilic acid and 148 parts of β-piperidinoethyl chloride are refluxed together in 4000 parts of dry isopropanol according to the procedure of Example 1. β-Piperidinoethyl N,N-diphenylanthranilate is isolated by the method of Example 1. This oily base can be purified by distillation under high vacuum.

Example 13

388 parts of N,N-diphenylanthranilic acid and 149 parts of β-morpholinoethyl chloride are reacted in 4000 parts of anhydrous isopropanol according to the general method of Example 1. The β-morpholinoethyl N,N-diphenylanthranilate hydrochloride which is left after removal of the solvent crystallizes on standing. This material is washed with alcohol and recrystallized from nitrobenzene. It melts at 246–250° C. (with softening from 235° C.).

Example 14

200 parts of N-phenyl-N-p-tolylanthranilic acid and 90 parts of β-pyrrolidinoethyl chloride are reacted in 2000 parts of dry refluxing isopropanol for 7 hours. After the solvent is stripped off the residue is suspended in water, agitated with an excess of dilute sodium hydroxide solution, and then extracted with ether. The ether extract is dried over anhydrous potassium carbonate, filtered and evaporated. The residue of β-pyrrolidinoethyl N-phenyl-N-p-tolylanthranilate can be purified by distillation under high vacuum.

Example 15

To a suspension of 165 parts of N,N-di(p-tolyl)-anthranilic acid in 3000 parts of anhydrous methyl ethyl ketone are added 72 parts of β-diethylaminoethyl chloride. The mixture is agitated and refluxed for 6 hours. It is filtered hot with activated charcoal and evaporated under vacuum. The residue is treated with dilute caustic soda and extracted with ether. The ether solution is dried and evaporated. There is thus produced an oily light-colored residue of β-diethylaminoethyl N,N-di(p-tolyl) anthranilate.

Example 16

A mixture of 69 parts N-phenylanthranilic acid, 279 parts of o-iodotoluene, 20 parts of copper powder, 40 parts of anhydrous potassium carbonate and 240 parts of nitrobenzene is refluxed for 6 hours. The mixture is then distilled with steam and the aqueous residue is filtered, chilled and made acidic. The pale yellow precipitate of N-phenyl-N-o-tolylanthranilic acid is collected on a filter and washed with water. It is recrystallized from dilute methanol and from glacial acetic acid; M. P. 173–176° C. with sintering from 171° C.

N-phenyl-N-m-tolylanthranilic acid is prepared similarly using m-iodotoluene. It melts at 145–149° C. after recrystallization from dilute ethanol.

N-phenyl-N-2,4-xylylanthranilic acid is prepared by the foregoing method, using 297 parts of 4-iodo-1,3-dimethylbenzene in lieu of 279 parts of iodotoluene. It melts at 185–188° C. after recrystallization from alcohol and glacial acetic acid.

N-phenyl-N-p-phenetylanthranilic acid is made by the same procedure, using 317 parts of p-iodophenetole in place of 279 parts of iodotoluene. It melts at 135–138° C. after recrystallization from ethanol.

N-phenyl-N-p-tolylanthranilic acid is prepared by the foregoing method from 69 parts of N-phenylanthranilic acid and 279 parts of p-iodotoluene. After recrystallization from alcohol this acid melts at 174–176° C.

I claim:

1. A member of the group consisting of a basic ester of the formula

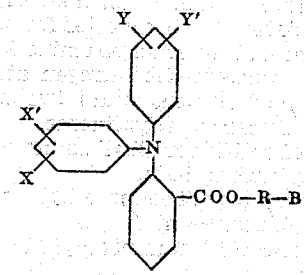

and salts thereof, wherein X, X', Y and Y' are members of the group consisting of hydrogen, lower alkyl and lower alkoxyl radicals, R is a lower alkaline radical, and B is an amino radical selected from the group consisting of di(lower alkyl)amino, N-piperidino, N-morpholino and N-pyrrolidino radicals.

2. The method of producing a basic ester of the formula

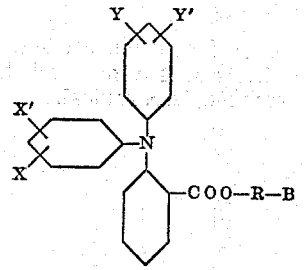

wherein X, X', Y and Y' are members of the group consisting of hydrogen, lower alkyl and lower alkoxyl radicals, R is a lower alkylene radical, and B is an amino radical selected from the group consisting of di(lower alkyl)amino, N-piperidino, N-morpholino and N-pyrrolidino radicals, which comprises reacting an aminoalkyl halide of the formula B—R—halogen with an acid of the formula

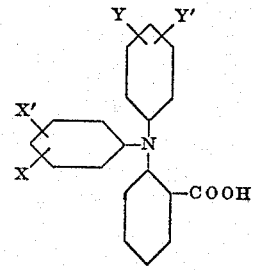

in an inert organic solvent and isolating the basic ester formed.

3. The method of producing a di(lower alkyl)-amino-lower-alkyl anthranilate wherein the nitrogen atom of the anthranilic acid bears two monocyclic aromatic hydrocarbon substituents, which comprises reacting a di(lower alkyl)-amino-lower-alkyl halide with an anthranilic acid bearing two monocyclic aromatic hydrocarbon substituents on the nitrogen atom thereof.

4. The method of producing a di(lower alkyl)- amino-lower-alkyl N,N-diphenylanthranilate which comprises reacting a di(lower alkyl)amino-lower-alkyl halide, wherein the alkyl groups contain not more than 5 carbon atoms, with N,N-diphenylanthranilic acid, in an inert organic solvent and isolating the basic ester formed.

5. The method of producing a diethylaminoethyl N,N-diphenylanthranilate which comprises reacting a diethylaminoethyl halide with N,N-diphenylanthranilic acid, in an inert organic solvent and isolating the basic ester formed.

6. A salt of a di(lower alkyl)amino-lower-alkyl anthranilate wherein the nitrogen atom of the anthranilic acid nucleus bears two monocyclic aromatic hydrocarbon substituents.

7. A salt of a di(lower alkyl)amino-lower-alkyl N,N-diphenylanthranilate.

8. A salt of a β-di(lower alkyl) aminoethyl N,N-diphenylanthranilate.

9. A salt of β-diethylaminoethyl N,N-diphenylanthranilate.

10. β-Diethylaminoethyl N,N-diphenylanthranilate hydrochloride.

11. A salt of a basic ester of the formula

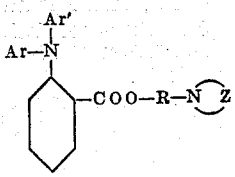

Wherein Ar and Ar' are monocyclic aromatic hydrocarbon radicals, R is a lower alkylene radical and Z is a lower alkylene radical.

12. A salt of a basic ester defined as in claim 11 wherein Ar and Ar' are phenyl radicals.

13. A salt of a basic ester defined as in claim 11 wherein Ar and Ar' are phenyl radicals and R is an ethylene radical.

14. A salt of β-N-piperidinoethyl N,N-diphenylanthranilate.

15. β-N-Piperidinoethyl N,N-diphenylanthranilate hydrochloride.

CARL PETER KRIMMEL.

REFERENCES CITED

The following references are of record in the file of this patent:

UNITED STATES PATENTS

| Number | Name | Date |
|---|---|---|
| 1,692,695 | Pope | Nov. 20, 1928 |
| 1,724,248 | Adams | Aug. 13, 1929 |
| 2,406,627 | Parker et al. | Aug. 27, 1946 |
| 2,429,275 | Parker et al. | Oct. 21, 1947 |
| 2,461,038 | Cusic | Feb. 8, 1949 |
| 2,502,451 | Goldberg et al. | Apr. 4, 1950 |

FOREIGN PATENTS

| Number | Country | Date |
|---|---|---|
| 172,447 | Germany | June 22, 1906 |
| 180,291 | Germany | Jan. 9, 1907 |

OTHER REFERENCES

Goldberg et al., Ber. Deut. Chem., vol. 40, pp. 2448–2452 (1907).